United States Patent Office 3,092,653
Patented June 4, 1963

3,092,653
2-(SUBSTITUTED-BENZYL)-1,3-PROPANE-
DINITRILES
Raymond G. Wilkinson, Montvale, N.J., and Thomas L. Fields, Pearl River, N.Y., assignors to American Cyanamid Company, New York, N.Y., a corporation of Maine
No Drawing. Original application July 15, 1958, Ser. No. 748,589, now Patent No. 3,013,069, dated Dec. 12, 1961. Divided and this application Apr. 25, 1961, Ser. No. 105,231
2 Claims. (Cl. 260—465)

This invention relates to new organic compounds and, more particularly, is concerned with novel substituted phenylethanes which may be represented by the following general formula:

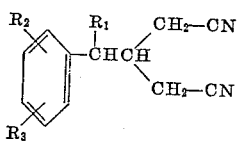

wherein $R_1$ is hydrogen, hydroxy, lower alkyl or a lower alkoxy radical, and $R_2$ and $R_3$ are hydrogen, halogen, hydroxy, lower alkyl, lower alkoxy or an aralkoxy radical. Suitable lower alkyl and lower alkoxy groups contemplated by the present invention are those having up to about 6 carbon atoms. Suitable aralkoxy groups are benzyloxy, phenthoxy, etc. Halogen is exemplified by bromine, chlorine and iodine.

The novel compounds of the present invention are useful intermediates for the preparation of 2-carboxymethyl and 2-formylmethyl-4-oxo-tetrahydronaphthalenes which form the subject matter of the copending application of Raymond G. Wilkinson and Andrew S. Kende, Serial No. 821,093, filed June 18, 1959. The new compounds of this invention are also useful in the synthesis of polyoxygenated cyclic compounds.

The new compounds of this invention may be prepared from the corresponding benzyl bromide according to the following reaction scheme:

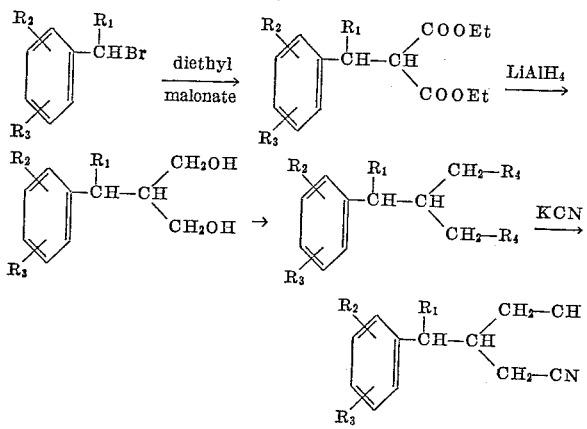

wherein $R_1$, $R_2$ and $R_3$ are as hereinbefore defined, and $R_4$ is chlorine, bromine, iodine, lower alkylsulfonyloxy or an arylsulfonyloxy radical.

The reaction conditions are not especially critical. The reaction of the benzyl bromide with diethyl malonate salt is preferably carried out in a refluxing solution of a lower alkanol. The benzyl malonic ester so formed is reduced with lithium aluminum hydride in a conventional manner. The formation of the bis-sulfonates from the intermediate 1,3-propanediols is likewise conventional. Alternatively, the bis-halo intermediates may be prepared as shown in the examples which follow. The formation of the dinitrile by reaction with an alkali metal cyanide is also conventional.

The invention will be described in greater detail in conjunction with the following specific examples.

Example 1

94.0 grams (0.6 mole) of 2-chloro-5-methoxytoluene [Peratoner and Condorelli, Gazz. Chem. Ital. 28, I, 213 (1898)] are added to 600 milliliters of reagent grade carbon tetrachloride, 117.4 grams (0.66 mole) of N-bromosuccinimide and 0.1 gram benzoyl peroxide. The reaction mixture is stirred at reflux temperature and additional 0.1 gram quantities of benzoyl peroxide are added after 1½ and 18 hours. After 21 hours the volume of solvent is reduced to approximately 250 milliliters and the succinimide filtered off. The filtrate is washed with three 200 milliliter portions of water, dried over anhydrous $MgSO_4$ and filtered. The solvent is removed under reduced pressure and the residual oil crystallized on standing overnight. Yield of crude 2-chloro-5-methoxybenzyl bromide, 131.0 grams. The pure compound crystallizes from (20°–40°) petroleum ether as white needles, melting point 55.5°–57.5° C.

Example 2

131.0 grams (0.55 mole) of 2-chloro-5-methoxybenzyl bromide in 300 milliliters of absolute ethanol is added over a 1 hour period to a refluxing solution of diethyl malonate (145 grams, 0.9 mole) and sodium methylate (32.4 grams, 0.6 mole) in absolute ethanol. The refluxing is continued for an additional 2½ hours and the reaction mixture concentrated to approximately half volume. The sodium bromide is filtered off and the filtrate acidified by the slow addition of acetic acid. The remainder of the solvent is removed under reduced pressure and the residual oil taken up in ether. The ethereal solution is washed with three 200 milliliter portions of water and dried over anhydrous $MgSO_4$. The ether and excess diethyl malonate are removed under water pump pressure. Diethyl-2-chloro-5 - methoxybenzyl - malonate is collected at 155°–168° C./0.4–0.8 mm.; yield: 90.0 grams; $n_D^{25}$ 1.5030. Overall yield based on 2-chloro-5-methoxy-toluene is 48%.

Example 3

A solution of 105 grams (0.33 mole) of diethyl-2-chloro-5-methoxybenzylmalonate in 360 milliliters of dry ether is added slowly with stirring to 19.5 grams (0.513 mole) of $LiAlH_4$ dissolved in 700 milliliters of dry ether. The mixture is stirred and refluxed for 4½ hours before decomposing the excess hydride with ethyl acetate. The mixture is acidified with 6 N HCl, washed with water, and allowed to stand over 70 milliliters of 5 N NaOH over the weekend. The ether layer is washed with $H_2O$, dried over $MgSO_4$ and concentrated to an almost colorless oil which turns to a mushy solid on seeding. Distillation at 0.1 mm. gives 64 grams (84%) of a colorless oil at 160°–175° C. with a small forerun at 130°–160° C. On seeding, the main fraction gives white crystals of 2-(2'-chloro-5'-methoxybenzyl)-1,3-propanediol, melting point 41°–46° C.

Example 4

To 1.5 grams (5.0 mmole) of 2-(2'-chloro-5'-methoxybenzyl)-1,3-propanediol in 10 milliliters of benzene is added 2.20 grams (11.5 mmole) of p-toluenesulfonylchloride. The solution was cooled to 0° C. and 1.0 milliliter of pyridine added. This mixture is allowed to stand for 4 days at 5° C. with a considerable amount of pyridine hydrochloride crystallizing out. The solution is filtered and the filtrate is extracted with dilute sodium bicarbonate solution. The benzene layer is concentrated to a gum. This gum can be crystallized from ethanol and water to give white crystals of 2-(2'-chloro-5'-methoxybenzyl)-1,3-propanediol-bis-toluenesulfonate.

The majority of the crude gummy 2-(2'-chloro-5'-methoxybenzyl)-1,3-propanediol-bis-toluenesulfonate is reacted in 25 milliliters of ethanol and 5 milliliters of water with 1.0 gram (20 mmoles) of sodium cyanide. After 16 hours refluxing the mixture is concentrated, extracted with ether, and the ether removed whereby the β-(2-chloro-5-methoxybenzyl)glutaronitrile is recovered as a residual oil.

*Example 5*

To a solution of 23.06 grams (0.100 mole) of 2-(2'-chloro-5'-methoxybenzyl)-1,3-propanediol in 100 milliliters of dry benzene is added 24.0 milliliters (0.35 mole) of thionyl chloride. This mixture is allowed to stand at room temperature for 18 hours and is then refluxed for 6 hours. Methanol is added slowly to react with the excess thionyl chloride. The reaction mixture is washed with 2 N NaOH until alkaline, then with water until neutral, dried, and concentrated to yield 2-(2'-chloro-5'-methoxybenzyl)-1,3-dichloropropane.

To this crude oil is added a solution of 45 grams (0.34 mole of NaI in 350 milliliters of acetone. The mixture is refluxed for 5 days with intermittent filtration removing 9.9 grams of NaCl (0.17 mole). The mixture is then concentrated to a mush, water added, and the product extracted with ether. Evaporation of the ether gives an almost black oil from which only small yields of crude product can be obtained by crystallization from ethanol. However, evaporative distillation at 0.1 mm. gives a yellow forerun at about 130° C., and a yellow gum from 130° to 150° C., which crystallizes readily from ethanol to give 16.2 grams of white needles M.P. 67°–69° C. Additional material is recovered by redistillation of the forerun and the residues yielding 7.2 grams of material melting from 58° to 68° C. Total yield of 2-(2'-chloro-5'-methoxybenzyl)-1,3-diiodopropane, 23.4 grams (52%). Recrystallization from ethanol raises the melting point to 68°–69.5° C.

*Example 6*

To 11.90 grams (26.4 mmoles) of 2-(2'-chloro-5'-methoxybenzyl)-1,3-diiodopropane dissolved in 75 milliliters of 95% ethanol is added 4.9 grams (100 mmoles) of sodium cyanide in 10 milliliters of water. This mixture is refluxed for 20 hours before concentrating under vacuum. Water is added and the oil which separates is extracted with ether. The ether layer after being dried over anhydrous magnesium sulfate is concentrated on the steam bath under an air jet to give 6.1 grams of β-(2-chloro-5-methoxybenzyl)glutaronitrile as a tan oil.

*Example 7*

2-(2'-chloro-5'-methoxybenzyl)-1,3-dibromopropane is prepared from 11.81 grams (51.2 mmoles) of 2-(2'-chloro-5'-methoxybenzyl)-1,3-propanediol in 25 milliliters of reagent benzene by the addition of 2.4 milliliters (25.2 mmoles) of phosphorus tribromide and one drop of pyridine and refluxing the mixture for 40 minutes. The benzene solution is washed with water, dried over anhydrous magnesium sulfate and concentrated to yield 2-(2'-chloro-5'-methoxybenzyl)-1,3-dibromopropane.

*Example 8*

β-(2-chloro-5-methoxybenzyl)glutaronitrile is prepared from 6.6 grams (1.85 mmoles) of crude 2-(2'-chloro-5'-methoxybenzyl)-1,3-dibromopropane in 15 milliliters of absolute ethanol by adding 3.5 grams (70 mmoles) of sodium cyanide in 6 milliliters of water and refluxing the mixture for 18 hours. The ethanol is removed and the yellow oil which separates is taken up in ether. After washing the ether solution with water, drying over anhydrous magnesium sulfate and concentrating the yellow oily residue is, in part, distilled at 0.3 mm. with a colorless oil coming over at 120°–130° C.

This application is a division of our copending application Serial No. 748,589, filed July 15, 1958, now U.S. Patent 3,013,069.

What is claimed is:
1. A compound of the formula:

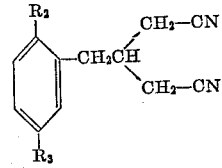

wherein $R_2$ is selected from the group consisting of chlorine, bromine and iodine, and $R_3$ is lower alkoxy.

2. β-(2-chloro-5-methoxybenzyl)glutaronitrile.

References Cited in the file of this patent
UNITED STATES PATENTS
2,788,360     Westfahl _____ Apr. 9, 1957

OTHER REFERENCES

Migrdichian, "Organic Synthesis," vol. 1, pages 11, 225, 423, 512 (1957). (Copy in Sci. Library.)